United States Patent [19]

Boyen

[11] Patent Number: 5,029,519
[45] Date of Patent: Jul. 9, 1991

[54] FOOD COOKING UTENSIL WITH LID-COOLING MEANS

[75] Inventor: Lodewijk J. Boyen, Alleur, Belgium

[73] Assignee: ITT Industries Belgium S.A., Brussels, Belgium

[21] Appl. No.: 352,428

[22] Filed: May 16, 1989

[30] Foreign Application Priority Data

May 17, 1988 [BE] Belgium .............................. 08800543

[51] Int. Cl.⁵ .............................................. A47J 37/12
[52] U.S. Cl. ...................................... 99/341; 99/403; 99/476; 99/517; 126/21 A; 219/400
[58] Field of Search ................. 99/325, 341, 348, 447, 99/467, 468, 473–476, 483, 517; 219/400; 126/21 A, 369; 220/903

[56] References Cited

U.S. PATENT DOCUMENTS

| | | | |
|---|---|---|---|
| 3,508,932 | 4/1970 | Pilz | 99/476 |
| 3,777,446 | 12/1973 | Grauer | 219/400 |
| 3,933,145 | 1/1976 | Reich | 99/476 |
| 4,038,968 | 8/1977 | Rovell | 99/476 |
| 4,373,511 | 2/1983 | Miles et al. | 99/467 |
| 4,426,923 | 1/1984 | Ohata | 99/483 |
| 4,480,164 | 10/1984 | Dills | 219/400 |
| 4,776,265 | 10/1988 | Ojima | 99/348 |
| 4,817,509 | 4/1989 | Erickson | 99/447 |
| 4,903,587 | 2/1990 | Nagasaka et al. | 126/21 A |

FOREIGN PATENT DOCUMENTS

| | | | |
|---|---|---|---|
| 0165525 | 7/1986 | Japan | 219/400 |
| 0300121 | 12/1989 | Japan | 126/21 A |
| 8809143 | 12/1988 | PCT Int'l Appl. | 99/348 |

Primary Examiner—Timothy F. Simone
Attorney, Agent, or Firm—Thomas L. Peterson

[57] ABSTRACT

The food cooking utensil comprises a vessel (2) which is intended to contain the foods to be cooked in a liquid and is provided with a lid (31), at least one opening (23) for the admission of air into a space, at least one outlet opening (24) for the air introduced into the space, and means (25) for producing a current of air between said inlet opening or openings and said outlet opening or openings.

The utensil according to the invention is characterized in that at least a part of said space (22) is bounded by two walls (32, 33) of the lid (31) which are spaced apart so that the air circulating in said space (22) through the action of said means (25) absorbs heat and lowers the temperature of the lid (31).

13 Claims, 6 Drawing Sheets

FOOD COOKING UTENSIL WITH LID-COOLING MEANS

BACKGROUND OF THE INVENTION

The present invention relates to a food cooking utensil, particularly an electric cooking utensil of the type comprising a vessel which is intended to contain the foods to be cooked in a liquid and is provided with a lid, at least one opening for the admission of air into a space, at least one outlet opening for the air introduced into the space, and means for producing a current of air between said inlet opening or openings and said outlet opening or openings.

An electric cooking utensil, particularly a deep fryer, of the type indicated in the preceding paragraph is known from Belgian Patent No. 901,573.

A disadvantage of this known cooking utensil consists in that the means for producing a current of air between said inlet opening or openings and said outlet opening or openings promote the evacuation of fumes from the vessel, without substantially cooling the walls of the cooking utensil lid.

In this known domestic cooking utensil the air is mixed with the fumes in the vessel itself, thus giving rise to turbulence, which has the consequence that the temperature of the cooking liquid is lowered and that water vapour contained in the fumes is condensed, so that drops of water fall into the vessel.

SUMMARY OF THE INVENTION

The present invention seeks to obviate these disadvantages.

The subject of the invention is a food cooking utensil of the type described in the first paragraph of the present specification, this utensil being essentially characterized in that at least a part of the space is bounded by two walls of the lid which are spaced apart so that the air circulating in this space through the action of said means absorbs calories heat and lowers the temperature of the lid.

According to one feature of the invention, in the case of a utensil having a casing surrounding the vessel, this casing being spaced apart from said vessel, the space is composed of at least two chambers, a first chamber being bounded by walls which extend between the vessel and the casing and communicating through at least one intermediate opening with a second chamber bounded by two walls of the lid which are spaced apart, while the means produce a current of air in the first and second chambers.

In one embodiment of the utensil according to the invention at least one outlet opening is provided in the lid.

The utensil according to the invention may be provided in a known manner with a sight window, which is preferably disposed in its lid, this sight window having an upstream edge and a downstream edge lying opposite one another.

In one embodiment of the invention for a utensil of this kind, at least one opening for the admission of air into the vessel is provided close to the upstream edge of the sight window, while at least one opening for the evacuation of this air is provided close to the downstream edge of said sight window, so that through the action of the means producing a current of air a layer of air is displaced over that face of the sight window which is directed towards the vessel.

The sight window is preferably carried by an inner lid wall spaced apart from an outer wall of this lid, so that a chamber is formed in this lid between the outer and inner walls of the latter, the outlet opening or openings for the air introduced into the vessel being provided in the inner lid wall.

Other features and details of the invention will emerge from the following detailed description, in which reference is made to the accompanying drawings, in which:

DETAILED DESCRIPTION OF PREFERRED EMBODIMENTS

Figure 1:
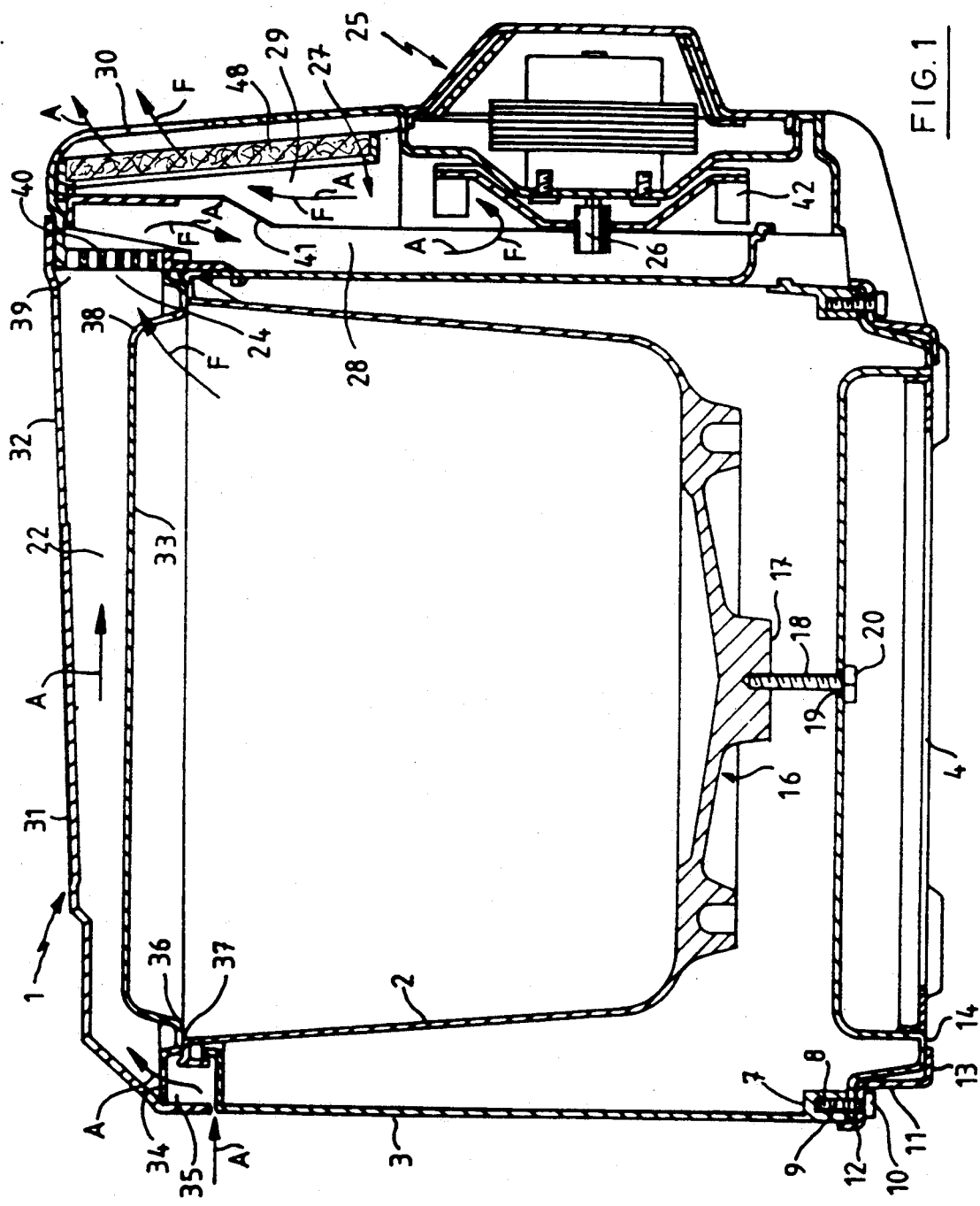
FIG. 1 shows a first embodiment of a utensil according to the invention, partly in cross section.

In these different figures the same reference numerals designate identical or similar elements.

FIG. 1 shows in cross section a cooking utensil 1. This utensil 1 has a vessel 2 intended to hold foods which are to be cooked in a liquid. A utensil 1 of this kind is, for example, a deep fryer, that is to say a utensil intended for cooking foods in oil or melted fat.

This utensil 1 also has a casing 3, surrounding the vessel 2, and a base 4. At one of its ends the casing 3 has a rim 7 provided with tapped holes 8 intended for allowing the passage of a threaded stem 9 of screws 10. These screws 10 enable a connection member 11 to be fastened to said casing 3. This connection member 11 is in the form of a sectional member of which a first flange 12 is intended for fastening the connection member 11 to the casing 3, while the second flange 13 of said sectional member is intended to bear against a bottom face 14 of the base 4.

At its bottom 15 the vessel 2 is fastened to a plate 16 provided with a central protuberance 17. This protuberance 17 carries a threaded rod 18, which passes through an aperture 19 provided in the base 4. A nut 20 screwed onto the rod 18 and bearing against the base 4 enables the vessel 2, the casing 3 and the base 4 to be fastened together. This fastening is achieved through the engagement of the end 6 of the casing in a groove 21 formed in the vessel 2 when the nut 20 is tightened on the threaded rod 18.

The utensil 1 is provided with a lid 31 hinged on the casing 3. This lid 31 comprises an outer wall 32 and an inner wall 33, between which a space 22 extends.

The lid 31 has an air outlet opening 24 and an air inlet opening 34 which is situated in a groove 35 adjacent to a flange 36 on the inner wall 33, said flange 36 being intended to bear against a top edge 37 of the vessel 2 when the lid 31 is closed.

The means 25 enable a current of air (arrow A) to be produced between the inlet opening or openings 23 and outlet opening or openings 24 of the space 22. This current of air A absorbs heat and lowers the temperature of the lid 31.

The means 25 intended for the circulation of air in the space 22, or in a part of said space, consist of a fan 26 mounted in a duct 27. In the form shown in FIG. 1 the fan 26, driven by an electric motor, draws out the air situated in the space 22. It is obvious that this fan could blow air into the space 22, or into a part of said space, instead of drawing it out.

The duct 27 comprises two adjacent, substantially parallel parts 28, 29, the part 28 connecting the outlet opening 24 provided in the lid 31 to the fan 26, while the part 29 of the duct 27 has an outlet 30 for evacuating to the atmosphere the air drawn out by the fan 26.

In the embodiment shown in FIG. 1, the inner wall 33 of the lid 31 has an opening 38 in order to enable the means 25 to draw off fumes (arrow F) given off in the vessel 2 during the cooking of food.

At the inlet 39 of the duct 27 a filter 40 may be fitted, this filter 40 being intended to retain droplets or particles of oil or fat entrained by the fumes (F), so as to prevent these particles from being deposited on the walls 41 of said duct 27 or on the blades 42 of the fan 26.

Finally, the duct 27 is provided with a filter 48 close to its outlet 30 through which the air (A) and fumes (F) drawn out by the fan 26 are evacuated.

Figure 2:
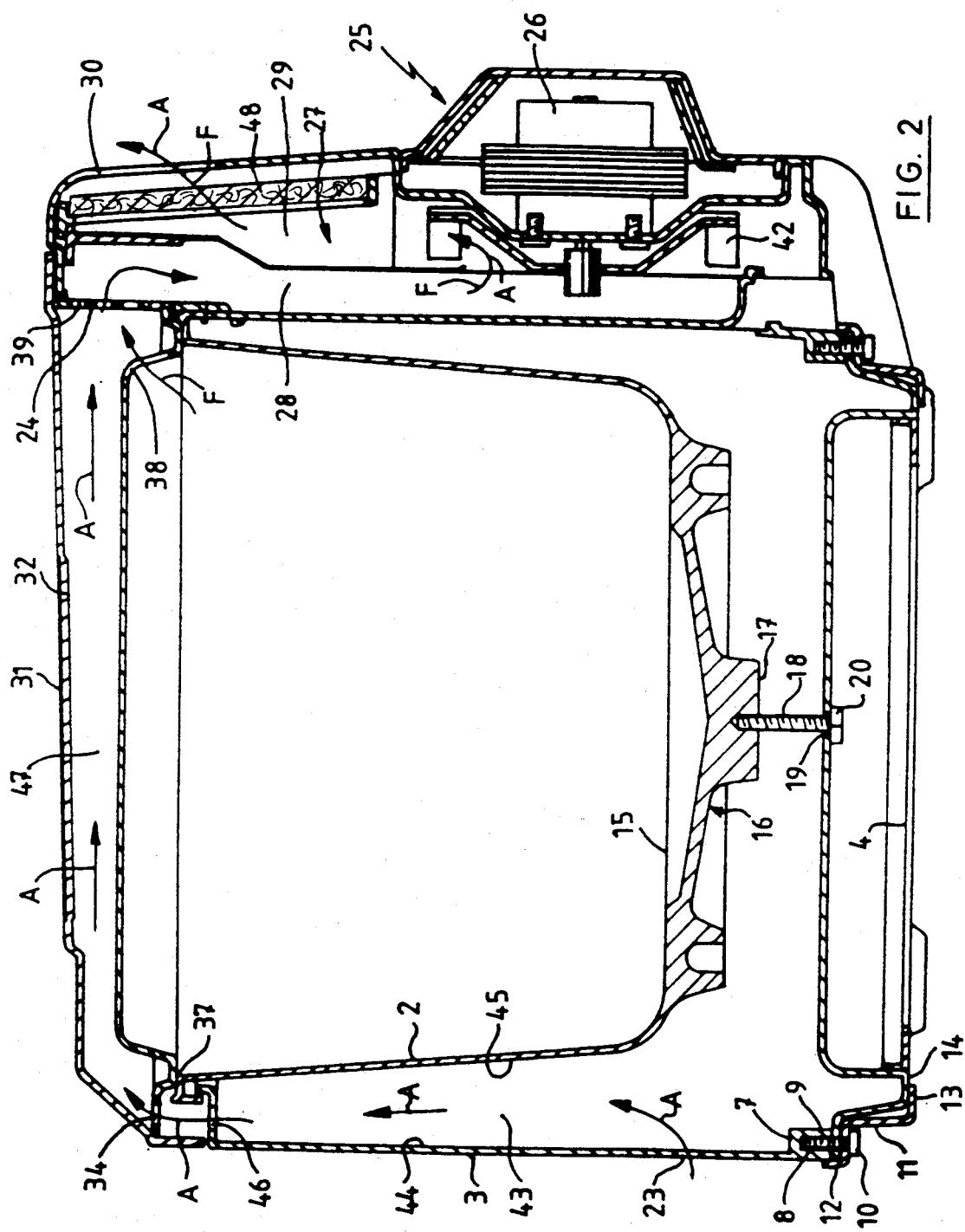
FIG. 2 is a similar view to FIG. 1 of a second embodiment of a utensil according to the invention.

FIG. 2 shows a second embodiment of a cooking utensil according to the invention, which is similar to that shown in FIG. 1.

In this second embodiment, the casing 3 has an opening or preferably a plurality of openings 23 for the admission of air into a first chamber 43 in the space 22, this first chamber 43 being bounded by the side walls 44, 45 of the vessel 2 and of the casing 3.

The air entering this chamber 43 in the space 22 through the openings 23 is then passed through an intermediate opening 46 provided in the casing 3 near the edge 37 of the vessel 2.

The lid 31 has an inlet opening 34 adjacent to the intermediate opening 46, so that the chamber 43 is in communication with a second chamber 47 in the space 22 situated between an outer wall 32 and an inner wall 33 of the lid 31.

The air entering this second chamber 47 in the space 22 and the fumes are drawn out by the means 25 in the manner described in connection with the utensil shown in FIG. 1. However, the duct 27 is not provided with a filter close to its inlet 39.

Figure 3:
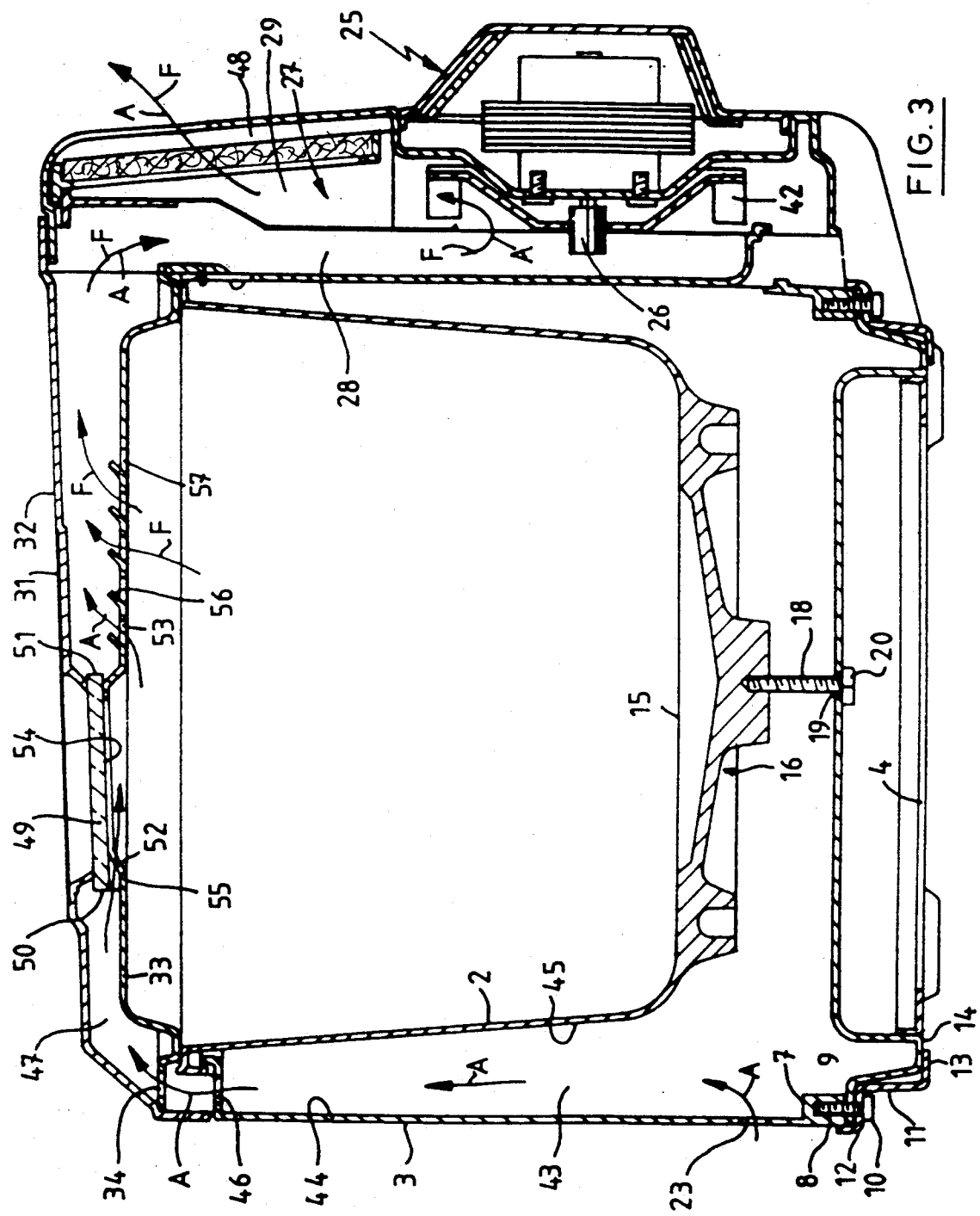
FIG. 3 is a cross-sectional view similar to that in FIG. 2, showing a third embodiment of a utensil according to the invention.

FIG. 3 shows a utensil according to the invention which is similar to that shown in FIG. 2.

However, it differs from the latter in the design of its lid 31.

This lid 31 is provided with a sight window 49 having an upstream edge 50 and a downstream edge 51 disposed opposite each other. This sight window is made of a transparent material so as to enable a user to ascertain the degree of cooking of the foods in the vessel without having to open the lid 31.

The sight window 49 is carried by the inner wall 33 of the lid 31 and is preferably wedged between the inner wall 33 and the outer wall 32 of said lid 31, said walls 32, 33 being spaced apart to form a chamber 47.

At least one opening 52 for the admission of air into the vessel 2 is provided close to the upstream edge 50 of the sight window 49, while at least one opening 53 for the evacuation of this air is provided close to the downstream edge 51 of the sight window 49. Thus, through the action of the means 25 a current of air (arrows A) is produced near that face 54 of the sight window 49 which is directed towards the vessel 2 so that a layer or film of air is displaced over said face 54 of the sight window 49. This layer of air or this film of air prevents the fumes from coming into contact with said face 54 of the sight window 49, and thus prevents the deposition of particles or droplets of oil or fat or the misting-up of the face 54 of the sight window 49.

At least one deflector 55 is preferably provided near the upstream edge 50 of the sight window 49, on the side of that face 54 of the latter which is directed towards the vessel 2, so as to bring the air entering via the aforesaid inlet opening or openings 52 into contact with said face 54.

Thus, at any moment during the cooking, it is possible to ascertain the degree of cooking of the food without having to open the lid 31.

A plurality of outlet openings 57 for the air introduced into the vessel 2 are advantageously provided in the inner wall 33 of the lid 31. These openings 57 are provided with at least one flap 56 directing the air towards the outer wall 32 of the lid 31. These flaps 56 also direct the air towards the inlet 39 of the suction duct 27 in which the fan 26 is mounted.

These openings 57 also enable the means 25 to draw off the fumes (F) produced during the cooking of foods.

In this third embodiment of the utensil, which is illustrated in FIG. 3, the air entering the vessel 2 is guided in a direction substantially parallel to the sight window 49, thus preventing the creation of air turbulence in the vessel 2 or a movement of air towards the surface of the cooking liquid or towards the foods being cooked.

The fact that turbulence of the air entering the vessel 2 is avoided enables the mixing of the air and fumes present in the vessel 2 to be reduced to the greatest possible extent, so that the temperature of the fumes in the vessel 2 will not be excessively lowered. In this way the condensation of the water contained in the fumes and thus the falling of water droplets into the cooking liquid are avoided to the greatest possible extent. When the cooking liquid is oil or melted fat, such falling droplets give rise to the splashing of droplets of oil or fat, accompanied by considerable sputtering.

In the third embodiment of the cooking utensil according to the invention illustrated in FIG. 3, substantially all the air entering the vessel 2 is drawn off through the opening 53 by the means 25 and caused to bathe the outer wall 32 of the lid 31. The deflectors 56 are advantageously arranged so as not to give rise to turbulence in the chamber 47.

Figure 4:
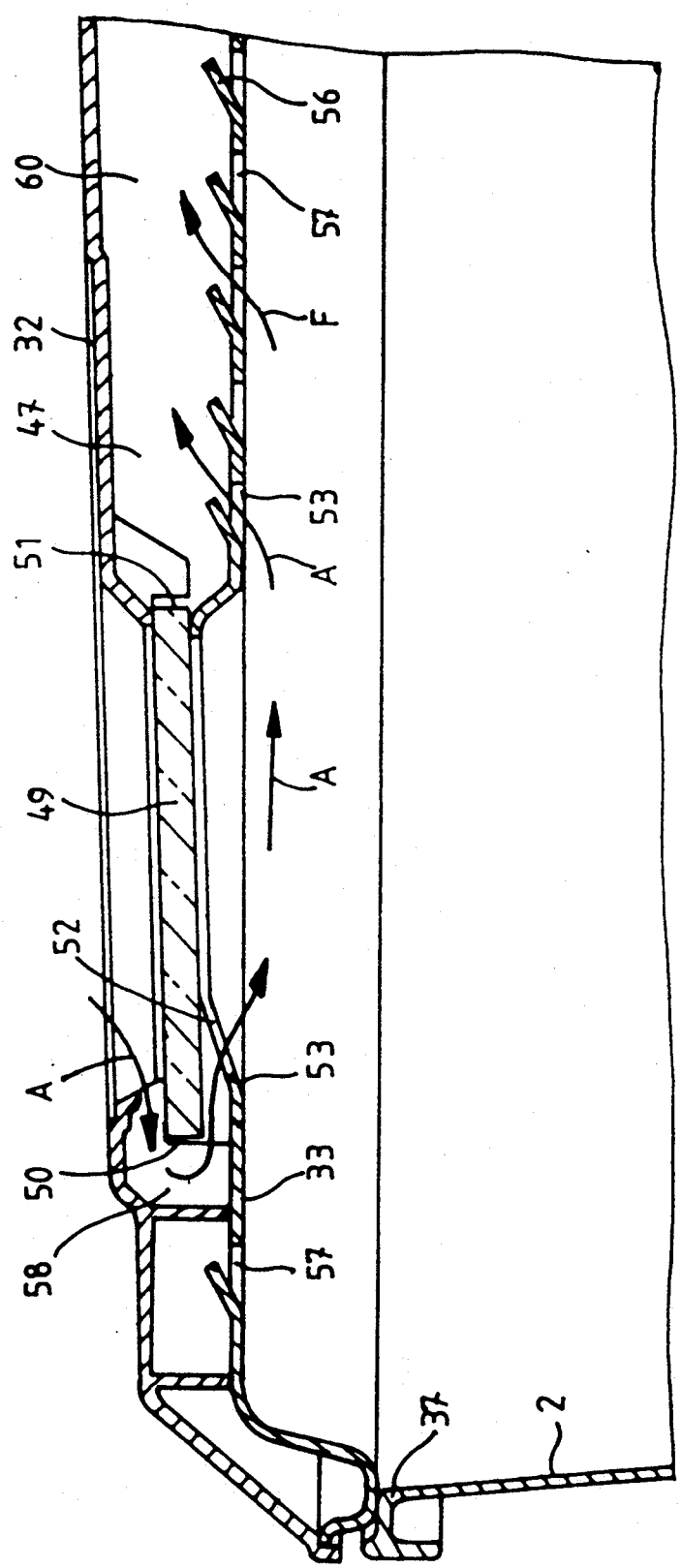
FIGS. 4 and 5 show respectively in cross section and in perspective, partly in section, a fourth embodiment of a utensil according to the invention, provided with a lid having a sight window.
Figure 5:
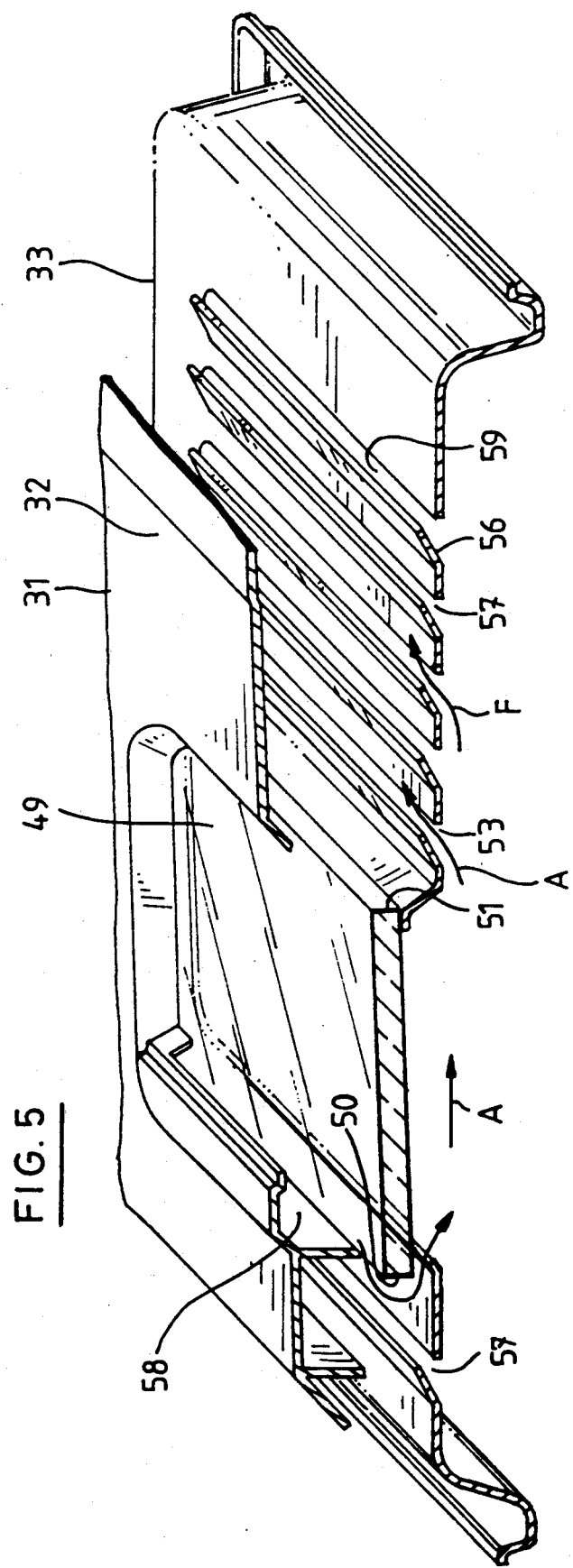

FIGS. 4 and 5 show in cross section and in perspective, partly in section, a part of a utensil according to the invention, and more particularly of a lid 31 of a utensil according to the invention.

This lid 31 is similar to that shown in FIG. 3. However, the air (arrows A) entering the vessel 2 through the opening 52 adjacent to the upstream edge 50 of the sight window 49 comes from a duct 58 extending between the inner wall 33 and the outer wall 32 of the lid 31.

The air entering the vessel 2 is caused to bathe a face 54 of the sight window 49 by means of a deflector 55 provided near the upstream edge 50 of the sight window 49.

When the sight window is rectangular, the air inlet and outlet openings advantageously extend along the long sides of the sight window 49.

The outlet openings 53, 57 provided in the inner wall 33 of the lid 31 consist of slots 59 parallel to one another and leading into a part 60 of the chamber 47 whose section increases towards one end of the lid 31 and which is in communication with the duct 27 in which the fan or suction device 26 is mounted.

Figure 6:
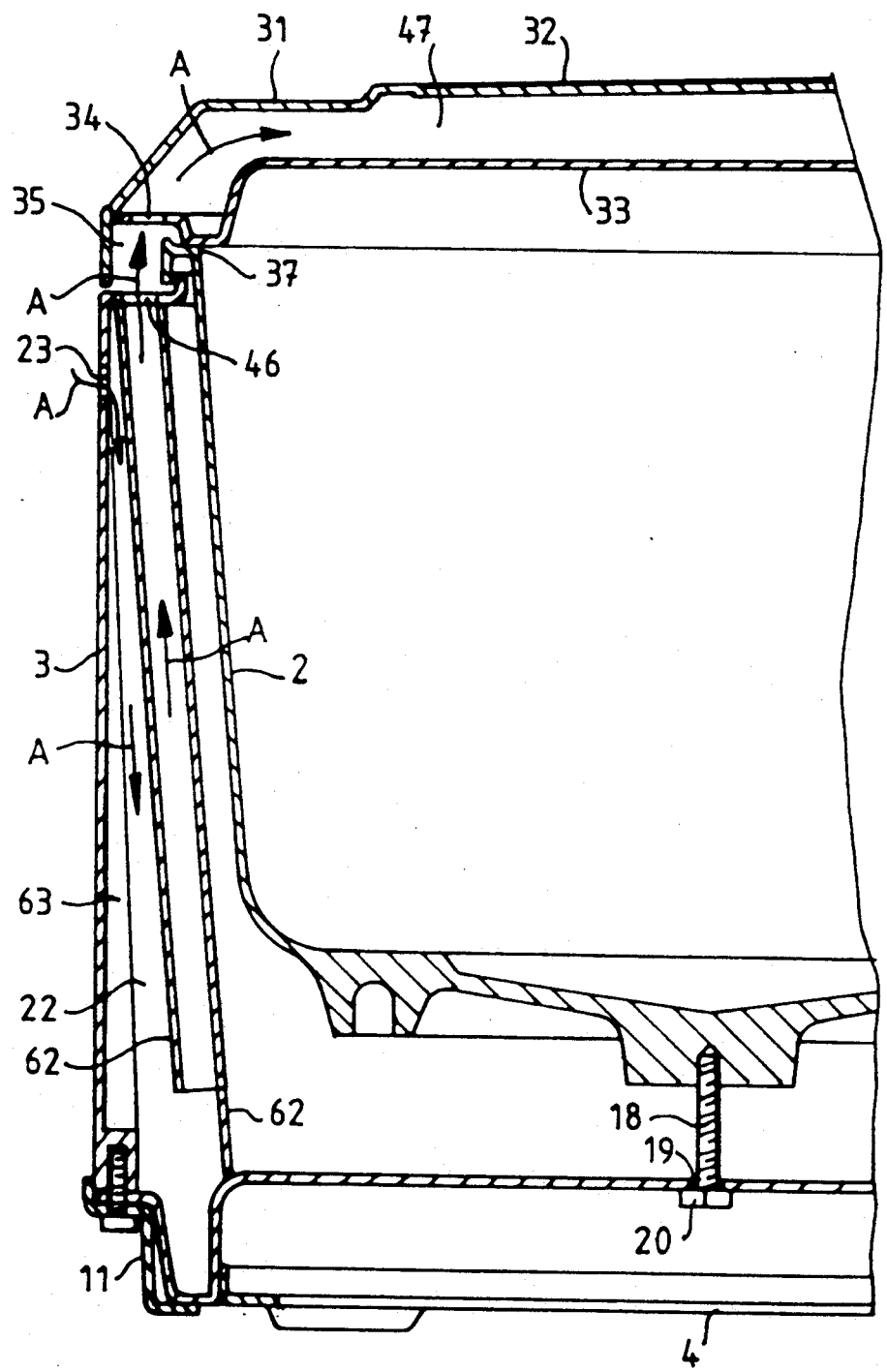
FIG. 6 is a similar view to that shown in FIG. 2, showing a fifth embodiment.

Finally, FIG. 6 shows a part of a cooking utensil 1 similar to that shown in FIG. 2. However, this cooking utensil 1 has one or more openings 23 provided in the casing 3 close to the edge 37, and also walls 62 forming baffles intended to divide the chamber 43 or to lengthen the path of the air (arrows A) in said chamber 43.

This embodiment permits maximum cooling of that part of the utensil which is adjacent to the lid 31, and on which handles (not shown) for handling the utensil are preferably mounted.

In the embodiment of the invention illustrated in FIG. 6 the casing 3 is also provided with inwardly directed fins 63 in order to increase the area of contact between the air and the casing 3, that is to say in order to increase the cooling of said casing 3.

Tests have been carried out with the cooking utensil of the type shown in FIG. 3.

A litre of corn oil was poured into the vessel 2 and this oil was brought to a temperature of 200° C. with the aid of electric resistors mounted on the bottom 15 of the vessel 2.

300 grams of potatoes cut into small sticks were then placed in a removable basket, such as a basket described in Belgian Patent 870,479.

After the lid 31 had been closed, the basket was immersed in the hot oil and the temperature of the casing near the edge 37 and that of the lid at its centre and near the inlet 39 of the duct 27 were measured.

This test was repeated after the fan 26 had been put into operation.

The following Table I shows the temperatures measured in these tests.

|  | Temperatures in °C. | |
|---|---|---|
|  | With fan | Without fan |
| Casing 3 (flange 36) | 90 | 100 |
| Lid 31 (centre) | 40 | 75 |
| Lid 31 (inlet 39) | 65 | 80 |

This Table I shows that it is possible for the temperature of the lid 31 to be appreciably lowered. The fall in temperature of the lid at its centre, amounting to about 35° C., considerably reduces the risks of burning the user when the latter needs to handle the lid regularly during the utilization of the utensil.

An appreciable reduction of the temperature of the casing 3 when the fan 26 is put into operation has also been observed.

This possibility of lowering the temperature of the casing by means of currents of air produced by a fan now makes it unnecessary for this casing to be enclosed in heat insulation or for materials, such as plastics materials, which have to withstand high temperatures to be used.

It is obvious that the casing 3 may also be fitted with temperature sensors, so that the fan will produce a current of air between the casing and the vessel only when a temperature threshold is reached. This makes it possible, for example, not to produce a current of air when the cooking liquid has not reached the desired temperature.

In the embodiment of the lid shown in FIG. 5, the wall 33 may be made of aluminium, while the wall 32 may be made of polypropylene. The wall 33 provided with slots 59 gives rise to a loss of head in the current of fumes and thus serves as a prefilter enabling particles of oil or fat to be eliminated.

It is also possible to provide a filter between the walls 32 and 33 of the lid in order to avoid any risk of the deposition of fat or oil on the fan blades.

What is claimed is:

1. Food cooking utensil comprising:
   a vertically disposed vessel (2) adapted to contain food to be cooked in a liquid;
   a lid (31) mounted on said vessel and having a temperature which rises above ambient air temperature during cooking of the food, said lid having spaced apart outer and inner lid walls (32, 33) which form a space between said lid walls;
   first inlet opening means (34, 52) in said lid (31) for introducing ambient air into said space between said lid walls;
   outlet opening means in the lid for evacuating from the utensil the air introduced into said space; and
   cooling means (25) for producing a current of ambient air between said first inlet opening means and said outlet opening means in only a substantially horizontal direction so that said ambient air circulates through said space, absorbs heat from the lid and lowers the temperature of the lid.

2. Utensil according to claim 1, further comprising:
   a casing (3) surrounding the vessel (2), said casing (3) being spaced apart from said vessel (2) to define a chamber (43); and
   second inlet opening means in said casing for introducing ambient air into said chamber (43); said chamber (43) communicating with said first inlet opening means so that the ambient air flows from said chamber (43) into said space between said lid walls.

3. Utensil according to claim 2, comprising baffles (62) between said lid walls and in said chamber.

4. Utensil according to claim 3, characterized in that said casing has inwardly directed cooling fins (63).

5. Utensil according to claim 4, characterized in that a filter is provided between said lid walls.

6. Food cooking utensil comprising: a vessel (2) which is adapted to contain food to be cooked in a liquid and which has a lid (31) whose temperature rises above ambient air temperature during cooking of the food; at least one inlet opening means for the introduction of ambient air into a space; at least one outlet opening means for evacuation of the ambient air introduced into the space; and cooling means (25) for producing a current of ambient air between said inlet opening means and said outlet opening means, wherein at least a part of the space is bounded by two walls of the lid which are spaced apart so that the air circulating in the space between said two walls through the action of said cooling means is heated by the lid and lowers the temperature of the lid (31); said utensil further comprising a sight window (49) having an upstream edge (50) and a downstream edge (51) lying opposite one another, characterized in that said inlet opening means comprises a first opening (52) for the introduction of air into the vessel (2) and located adjacent to the upstream edge

(50) of the sight window (49), and that said outlet means comprises a second opening (53) for the evacuation of this air and located adjacent to the downstream edge (51) of said sight window (49), so that, through the action of the cooling means (25) producing the current of air, a layer of air is displaced over that face (54) of the sight window (49) which is directed towards the vessel (2).

7. Utensil according to claim 6, further comprising a casing (3) surrounding and spaced from said vessel (2), and wherein said inlet opening means comprises a third opening (23) in said casing (3) for the introduction of the ambient air into the space between said casing (3) and said vessel (2), said second and third openings being in air communication with each other.

8. Utensil according to claim 6 or 7, wherein said outlet opening means comprises another opening (24), located in said lid, for evacuating heated air from the utensil, said another opening (24) being in air communication with said second opening.

9. Utensil according to claim 6 or 7, characterized in that a deflector (55) is located close to the upstream edge (50) of the sight window (49), on the side of that face (54) of the latter which is directed towards the vessel (2), in such a manner that the air enters through the aforesaid first opening (52) towards said face (54) of the sight window (49), thereby bathing said face (54).

10. Utensil according to claim 9, characterized in that the sight window (49) is carried by an inner wall (33) of the lid (31), which wall is spaced apart from an outer wall (32) of said lid (31), so that a chamber (47) si formed in the lid (31) between the outer wall (32) and inner wall (33) of the lid, the second opening (53, 57) being located in the inner wall (33) of the lid (31).

11. Utensil according to claim 10, characterized in that the second opening (53, 59) is composed of outlet slots (59) parallel to one another and leading into another chamber (60) of the space (22) between said inner and outer walls, said another chamber directing the current of air towards one end of the lid (31), which end communicates with a duct (27) in which a suction device (26) is mounted.

12. Cooking utensil according to claim 11, characterized in that a filter (40, 48) is mounted in the aforesaid duct (27) upstream or downstream of the suction device (26).

13. Cooking utensil according to claim 11, characterized in that the sight window (49) has a substantially rectangular shape and two long sides, said first opening (52) being adjacent to one of the long sides of the sight window (49), and at least one of said outlet slots being adjacent to the other long side of the sight window (49).

* * * * *